United States Patent [19]

Cretella et al.

[11] 4,141,127

[45] * Feb. 27, 1979

[54] METHOD OF REFURBISHING TURBINE VANE OR BLADE COMPONENTS

[76] Inventors: Salvatore J. Cretella, 180 Fitch St., North Haven, Conn. 06473; Matthew Bernardo, 62 Lee St., West Haven, Conn. 06516; Ralph T. De Musis, 547 Foxon Rd., North Branford, Conn. 06471

[*] Notice: The portion of the term of this patent subsequent to Jun. 14, 1994, has been disclaimed.

[21] Appl. No.: 745,166

[22] Filed: Nov. 26, 1976

Related U.S. Application Data

[63] Continuation-in-part of Ser. No. 613,479, Sep. 15, 1975, Pat. No. 4,028,787.

[51] Int. Cl.² .................... B23P 15/02; B23P 7/04
[52] U.S. Cl. .................... 29/156.8 B; 29/401 A; 29/402; 416/213 R; 416/241 R; 427/34; 427/142; 427/423; 427/331; 228/119
[58] Field of Search .................. 29/156.8 B, 156.8 H, 29/401 A, 401 E, 401 R, 402, 527.2, 527.4; 427/142, 34, 191, 423, 331; 228/119; 416/213 R, 241 R

[56] References Cited

U.S. PATENT DOCUMENTS

| | | | |
|---|---|---|---|
| 1,755,321 | 4/1930 | Hendrickson | 29/156.8 B |
| 2,120,525 | 6/1938 | McKerihan | 29/157.4 |
| 2,494,970 | 1/1950 | Shea | 29/401 A |
| 3,015,880 | 1/1962 | Stephenson | 427/423 |
| 3,564,689 | 2/1971 | Hirtenlechner | 416/213 |
| 3,576,065 | 4/1971 | Frazier | 416/213 |

FOREIGN PATENT DOCUMENTS

| | | | |
|---|---|---|---|
| 140341 | 2/1951 | Australia | 29/156.8 B |
| 800414 | 8/1958 | United Kingdom | 29/156.8 B |

*Primary Examiner*—C.W. Lanham
*Assistant Examiner*—Daniel C. Crane
*Attorney, Agent, or Firm*—H. Gibner Lehmann; K. Gibner Lehmann

[57] ABSTRACT

A method of refurbishing vane or blade components. Used turbine vanes or blades are cleaned, annealed and in some cases slotted adjacent their ends, after which any cooling passages (in the case of vanes) are welded closed and all cracks welded over, on both leading and trailing edges. The trailing edge, for a vane or blade component having a short chord, is built up by welding along its full length with an alloy wire, after which any slots that were cut adjacent the ends are closed, also by welding. Then the worn surfaces of the vane or blade are built-up by a plasma spray process, using a metal powder with added silica, to a thickness which can be as great as 30 to 40 thousandths of an inch. The built-up vane or blade is then sintered and thereafter surface finished to conform to the original contour of the component when new. Any cooling holes are finally recut, and the vane or blade polished as required and inspected.

7 Claims, 10 Drawing Figures

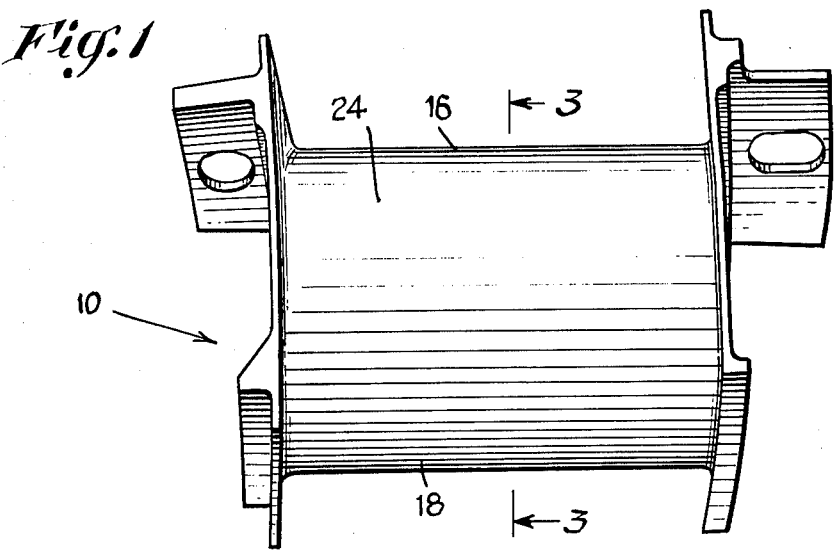
Fig. 1
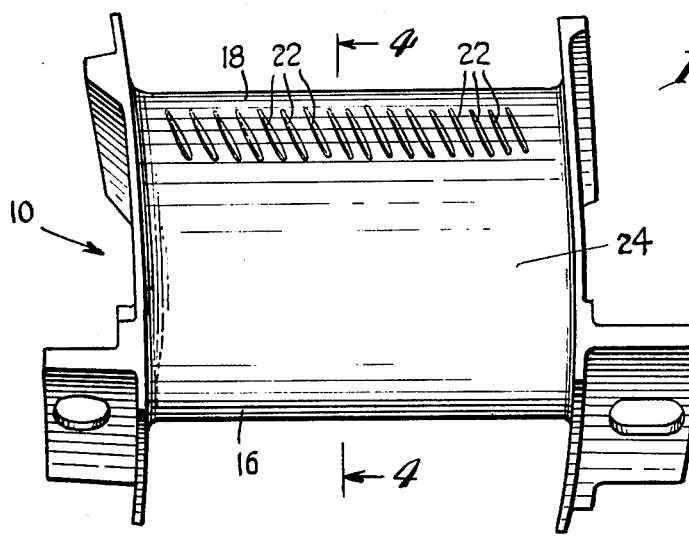
Fig. 2
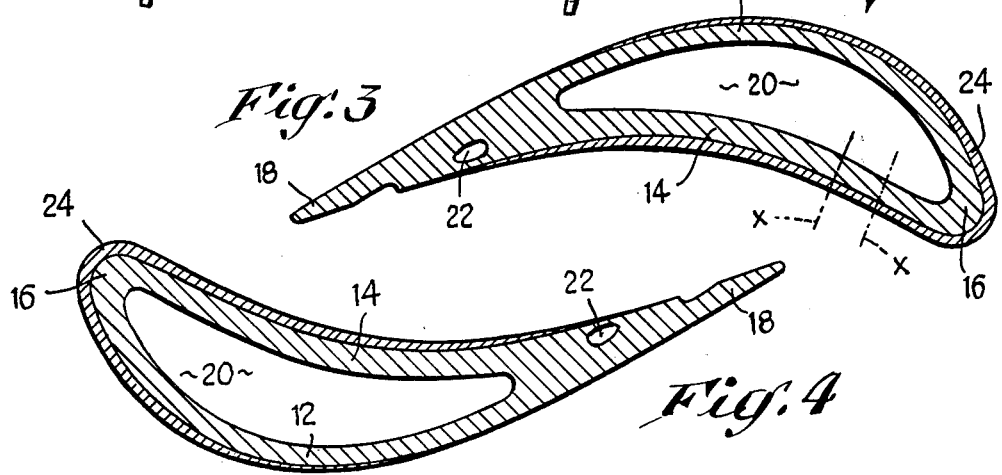
Fig. 3
Fig. 4

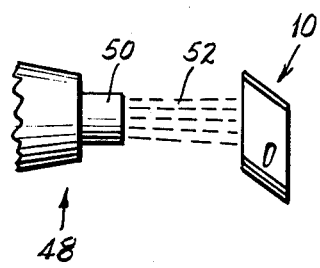
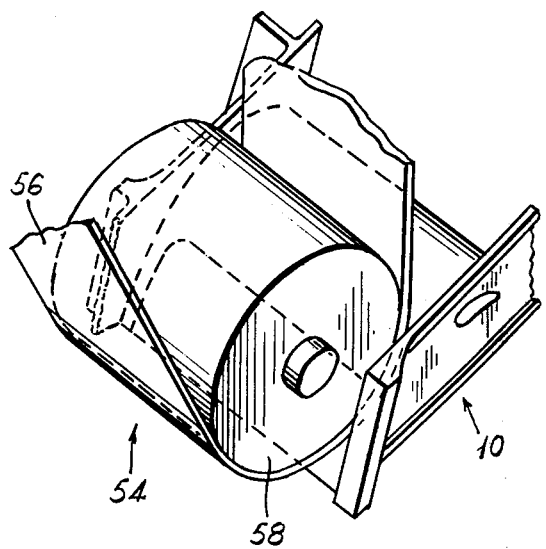

METHOD OF REFURBISHING TURBINE VANE OR BLADE COMPONENTS

CROSS REFERENCES TO RELATED APPLICATIONS

1. Application for United States Letters Patent on METHOD AND MEANS FOR REPAIRING TURBINE VANES in the name of Ralph T. DeMusis, Ser. No. 528,839, filed Dec. 2, 1974.

This application is a Continuation-In-Part of our copending application Ser. No. 613,479 filed Sept. 15, 1975, now U.S. Pat. No. 4,028,787 and entitled REFURBISHED TURBINE VANE AND METHOD OF REFURBISHMENT THEREOF.

BACKGROUND

This invention relates to the recovery of worn turbine vane or blade components, and more particularly to the reworking and resurfacing of said worn components so as to extend the useful life thereof.

Heretofore turbine vanes and blades as used in aircraft engines, power stations and the like have had a specific useful life, after which they were removed and discarded as being no longer capable of service. Since the initial cost of such components is quite considerable, this practice resulted in an appreciable expense that was involved with the maintenance of the turbines. In addition to the loss of use of the equipment involved and the expense of labor in installing new vanes or blades, there was the additional very considerable outlay required for the new replacement vanes or blades which were to be installed. This prior practice, which was necessary to maintain the equipment in reliable operating condition, therefore resulted in high operating charges.

SUMMARY

The above disadvantages and drawbacks of prior costly procedures for maintaining turbines and like equipment are in large part obviated by the present invention, which has for its main object the provision of an improved vane or blade refurbishing process which produces acceptable refurbished parts whereby there is considerably reduced the maintenance costs involved with wear and attrition of such turbine components. A related object of the invention is to provide an improved vane or blade refurbishing process for producing refurbished vanes or blades for turbines, whereby the resultant product meets rigid requirements of strength and performance, readily acceptable for the fields of service involved. A still further object of the invention is to provide an improved vane or blade refurbishing process which is economical to practice, and which produces acceptable refurbished components at a relatively low cost.

The above objects are accomplished by a method which first welds closed all cracks, pitted areas and the like, and in some cases slots the end portions of a vane or blade, then builds up by welding the trailing edge of the vane or blade to at least the original dimensions, and in some instances welds bead reinforcements which are coextensive with and spaced from the trailing edge of both sides of the vane or blade, after which the worn component surfaces are built-up by a plasma spray process using powdered metal with added silica, which latter burns off during the spraying procedure. Any slotting of the vanes or blades prior to appreciable build-up of the surfaces is done is prevent distortion during the addition of welding metal; the slots are thereafter welded closed, together with any cooling passages, before the application of the molten plasma-sprayed metal. Finally, the airfoil surfaces are recut to conform to the original contours, and any cooling holes are then cut through as per original specification.

Any slotting to relieve stresses, and/or lateral reinforcement by positioned welding beads, in conjunction with the welding of all cracks and subsequent metal build-up by plasma spraying results in a high quality refurbished product which meets the essential service requirements originally specified for new vane or blade components. The alloy metal which is added to the vanes or blades to build up the worn surfaces conforms to the original metallurgy, by virtue of the use of additional silica in the metal powder used in the plasma spraying, such silica burning off in the plasma stream.

Other features and advantages will hereinafter appear.

In the accompanying drawings:

FIG. 1 is an elevational view of the convex side of a turbine component in the form of a vane such as is refurbished by the process of the invention.

FIG. 2 is an elevational view of the concave side of the vane.

FIG. 3 is a cross-section through the vane, taken on the line 3—3 of FIG. 1.

FIG. 4 is a section taken on the line 4—4 of FIG. 2.

FIG. 9 is a side elevational view of a plasma spray gun, shown applying a coat of molten metal to one surface of a turbine vane.

FIG. 10 is a perspective fragmentary view of a grinding apparatus for removing controlled quantities of the built-up surface of the vane, to thereby restore the airfoil surface of the vane to its original dimensions.

Figure 5:
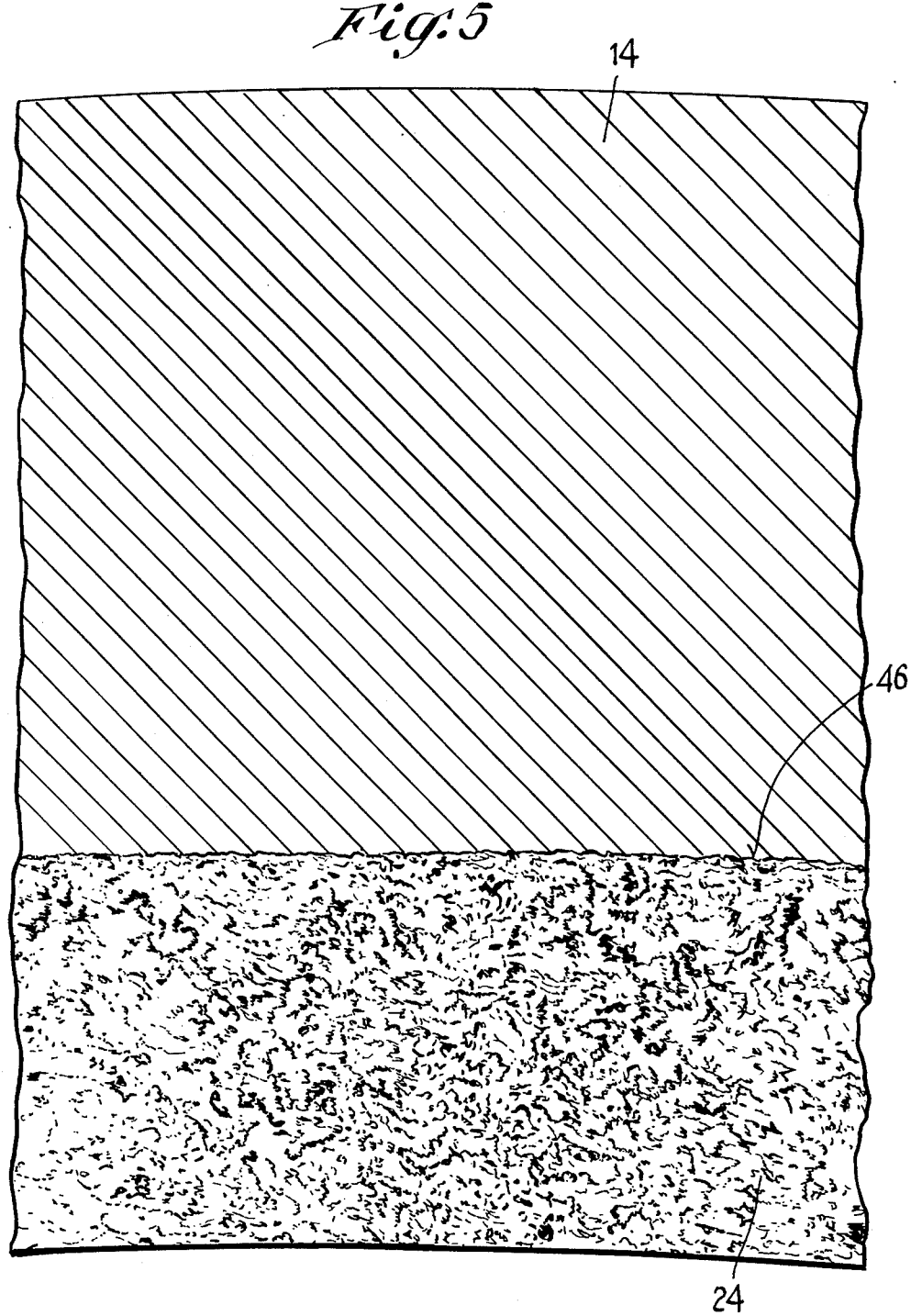
FIG. 5 is a fragmentary cross-section showing a portion (designated by the lines X—X) of FIG. 3 greatly enlarged.

While the illustrative embodiments of the invention described herein comprise vanes which are hollow structures provided with multiple air passages in the concave faces, the invention is applicable as well to solid structures, such as turbine blades having leading and trailing edges but no air passages or hollow interior. The term "component" as used herein is intended to designate either a vane or a blade.

Considering first FIGS. 1-4, a finished or refurbished vane designated 10 therein is seen to comprise convex and concave airfoil portions 12, 14 joined at a broad leading edge 16 and also at a narrow trailing edge 18. The vane 10 is hollow, having an airfoil-shaped inner space 20 between the airfoil portions. Adjacent the trailing edge 18, the vane 10 has cooling passages 22 which communicate with the interior space 20. Such passages are clearly seen particularly in FIG. 2.

The vane 10 of FIGS. 1-4 has been refurbished according to one process provided by the invention, and in FIGS. 3 and 4 the cross-sectional areas 24 designate overlay metal which has been added to the vane surfaces by a plasma spray process and thereafter refinished to conform to the original contours as specified for new vanes. The overlay metal of the areas 24 can be applied to build up a thickness of as much as 30 to 40 thousandths of an inch, and can be feathered as shown, as the overlay approaches the trailing edge 18 of the vane.

We have found that vanes which have their surfaces built-up by a plasma spray procedure according to the process of the invention meet rigid requirements for reuse, and are capable of an extended useful operative life.

The application of the overlay metal is such that the resultant alloy closely conforms to the alloy of the base metal of which the vane was originally cast. This is accomplished by the use of additional silica in the metal powder used in the plasma spraying. We have found that by the addition of 10% of silica to the powdered alloy, the burn-off of silica during the plasma spraying is such that the resultant alloy of the overlay can be made essentially the same as the alloy of the base metal. The base metal alloy of vanes refurbished by the invention can be that known commercially as Haynes Alloy #25, or #31, having a composition given by the table below.

| Essential Chemical Analysis Of Haynes Alloy #25 | |
|---|---|
| Parts by weight: | |
| 1. Carbon | .09 |
| 2. Silicon | .22 |
| 3. Manganese | 1.55 |
| 4. Phosphorus | .018 |
| 5. Sulfur | .007 |
| 6. Chromium | 20.32 |
| 7. Nickel | 10.56 |
| 8. Tungsten | 14.30 |
| 9. Iron | 2.25 |
| 10. Cobalt | 50.685 |

The above alloy is also used in various welding procedures on the vanes as described below, being supplied in the form of welding rod or wire known commercially as type L-605.

For the plasma spraying of the overlay metal, the Haynes alloy as above constituted is used in the form of a metal powder to which there is added 10% of silica. During the plasma spraying, the heat of the process burns off essentially the 10% additional silica whereby there remains the original alloy having a composition as set forth by the above table.

We have found that the bond between the base metal 12, 14 and overlay 24 in consequence is especially strong and durable, and not likely to fail during use of the vane.

Figure 6:
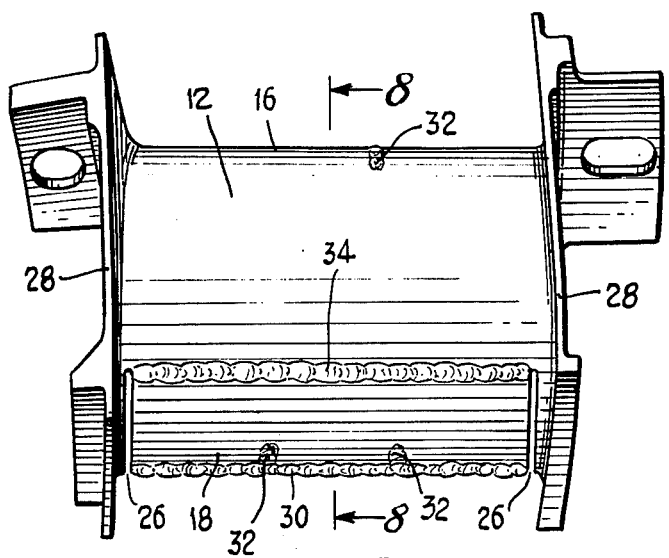
FIG. 6 is an elevational view of the convex side of a worn vane. This view is similar to the showing of FIG. 1 but illustrates certain steps in the processing of the component.

A preferred process of refurbishing vanes according to the invention, starting with used, worn components is essentially as follows:

Referring to FIG. 6, a vane to be refurbished according to the invention as exemplified in one embodiment thereof is cut to provide a pair of slits 26 adjacent the end flanges 28, said slits being made from the trailing edge 18 substantially parallel with the end flanges and for a distance roughly as shown in the figure. The slits 27 relieve stresses caused by any unequal heating of the vane during the processing, notably when welding portions of the vane is done. After formation of the slits 26, a welded bead 30 can be applied to the trailing edge, in cases where the chordal distance (from the leading edge) has become shortened by wear. Also, welded repairs indicated as short beads 32 are made to the leading and trailing edges to fuse over any hairline cracks. A pair of beads 34, 36 (formed by welding worn areas of the convex and concave surfaces respectively) reinforce the blade airfoil structure, such beads extending in spaced relation to the trailing edge 18 and substantially coextensive therewith.

Figure 7:
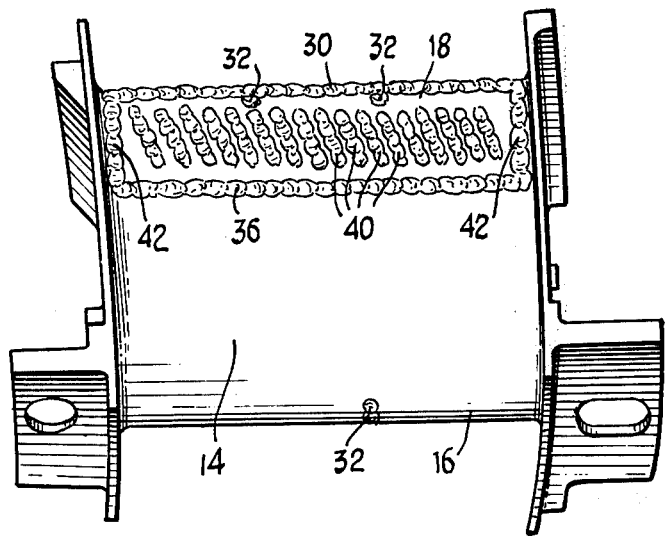
FIG. 7 is an elevational view of the concave side of the vane of FIG. 6, showing other steps and welded beadments as incorporated on the vane prior to the plasma spraying.

Also, as seen in FIG. 7, any air cooling passages 22 of the vane are welded closed by beads 40. Finally, the slots 26 are welded closed by beads 42. Thereafter, following any surface processing that is employed as indicated below, the airfoil surfaces are plasma sprayed to deposit a layer of alloy metal 24 indicated by the broken outline of FIG. 8. This is accomplished in an apparatus shown in FIG. 9, comprising a plasma spray gun 48 including a nozzle 50 from which there emanates a fine spray 52 of particles of molten having generally the same composition as that of the vane material, except with added silica as specified above. The gun liquifies the metal powder which is fed into it in an atmosphere of hydrogen, argon, or helium at a temperature of 7000° F. Excellent results are thus obtained, from the standpoint of surface density and bonding to the base metal. The layer 24 which is the built-up surfacing done by plasma spraying, can be as thick as from 30 to 40 thousandths of an inch, tapering to feathered edges as the trailing edge 18 of the vane is approached. Prior to the plasma spraying build-up, a surface processing of the vanes is carried out, in the form of a sand blast, or shot peen.

Figure 8:
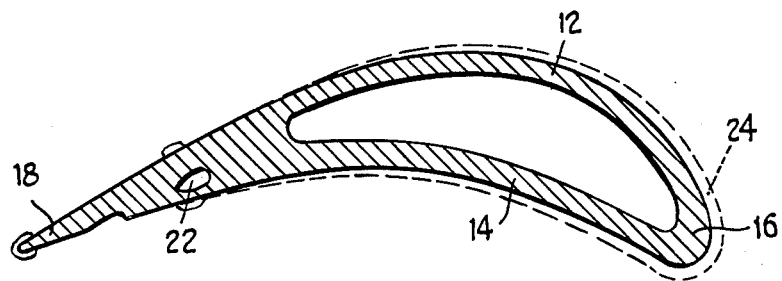
FIG. 8 is a cross-section through the vane, taken on the line 8—8 of FIG. 6.

The showings of FIGS. 6-8 illustrate steps in the preparation of a worn vane, prior to building up the surfaces by spraying of the molten metal in a plasma.

A complete procedure involving a process of the invention as exemplified in a preferred embodiment thereof, is as follows:

1. Used vanes are stripped of dirt, oil, etc. by placing them in a hydrochloric acid bath for 3 to 4 hours at a temperature of 180° F.

2. Thereafter, the vanes are rinsed in clear water and then vacuum annealed for two hours at a temperature of 2,175°.

3. The annealed vanes then visually inspected.

4. After passing visual inspection they are Zyglo inspected by means of a fluorescent penetrant.

5. Where necessitated by extensive wear, the vanes are then slotted approximately one inch deep, starting at the trailing edges, the slots being located about one quarter inch from the ends.

6. The air cooling holes are welded closed.

7. All cracks on the airfoil leading edge and trailing edge are welded.

8. If the trailing edges of the vanes are worn thin, they are built-up by welding, preferably using a Tungsten Inert Gas process, with Haynes #25 welding rod.

9. Convex and concave surfaces of the vane body adjacent but spaced from the trailing edge and coextensive therewith are reinforced by being built-up, involving placement of welding beads thereon, preferably using a Tungsten Inert Gas process. The beads can be as high as from 30 to 40 thousandths of an inch.

10. The slots that were made adjacent the two ends of the airfoil surfaces are welded closed and the surface conditioned by roughening and cleaning with a sand blasting or shot peening operation.

11. The worn airfoil surfaces are then plasma sprayed with metal alloy powder having added silica, to a thickness of from 30 to 40 thousandths at the leading edges, and tapering to feathered edges as the trailing airfoil edges are approached. Where the vanes have been originally cast with an alloy such as Haynes #25 Alloy (the composition of which is given above) the powdered metal used in the plasma spraying is also of the same alloy composition and additionally has added silica, preferably in the amount of 10% additional.

12. The vanes after being thus built-up, are sintered in a vacuum or hydrogen furnace (5 microns) at 2,200° F. for one hour, and then furnace cooled.

13. The built-up airfoil surfaces are now recut by an abrading process, such as one using an abrasive belt, to produce the original surface measurements. The refinishing is preferably accomplished by an automatic machine illustrated diagrammatically in FIG. 10 and designated 54, employing an endless abrasive belt 56 which passes over a drum 58, and which is powered by a suitable motor (not shown). Such a machine employing an endless abrasive belt is described and claimed in the copending application of Ralph T. DeMusis identified above.

14. The vanes are then inspected by a Zyglo process.

15. The air cooling holes are recut by a laser beam, as per original specifications.

16. The vanes are then hand polished as may be required.

17. Finally the vanes are inspected for accuracy of dimension.

The process as set forth above has been successfully carried out, and the resultant refurbished vane product has passed rigid tests, where the vane metal has been that known commercially as Haynes #25 Alloy, whose composition is given in the table herein.

FIG. 5 pictures a photomicrograph of a section through a refurbished vane, taken at the location generally designated in FIG. 3 between the broken lines X—X. The designation of FIG. 5 represents an enlargement or magnification approximately of 100 times. The section of overcast metal 24, having been etched, reveals a dense grain structure which is joined to the roughened surface of the vane airfoil portion 14 at an interface 46. Such roughened surface is the result of sand blasting or ball-peening the vane in preparation for the plasma spray overcast. The vane airfoil portion 14 is shown conventionally by the usual crosshatching lines. The use of a cross-hatching representation in the overlay 24 is considered not desirable since the cross-section surface has been etched to reveal grain structure, and the grain lines are of more importance. It will be seen that the grain structure of the overlay 24 is characterized by a desirable uniformity, as the section is traversed from the outer surface to the interface 46. The uniformity and the density of the plasma spray coating is important in providing for uniform wear or attrition when the vane is in use, with an absence of porous or soft spots which could break down quickly.

Turbine vines refurbished in accordance with our invention as explained above were tested as to the bond strength of the plasma sprayed overlay or recast material on the airfoil surfaces. It was found that the plasma spray deposit is uniform and of high density. Also, the bond between the overlay material and the base metal was excellent, with no evidence of separation at any points around the periphery of the airfoil. A spectrochemical analysis of the overlay material revealed a cobalt based alloy of the Haynes Alloy #25 type. Moreover, the overlay material was capable of being successfully coated with oxidation and sulfidation-resistant alloys. The strength of the overlay to base metal bond was equivalent or superior to conventional plasma spray type deposits.

The cost represented by the refurbishment process, while significant, constitutes a small fractional value of the initial cost of producing turbine vanes of this type. The resultant refurbished product meets the essential high quality standards set for new turbine vanes, and accordingly the present invention constitutes a distinct advance and improvement in the art.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention.

We claim:

1. The method of refurbishing a turbine component, which includes the steps of welding cracks in the component surface, slitting portions of the component at the two ends of the trailing edge to relieve stresses in the component, welding the trailing edge of the component to build up the same, welding the slitted portions closed, plasma spraying molten metal on eroded surfaces of the component to build up the same beyond the original surfaces, and grinding down the built-up surfaces to refinish the same to conform with the original component surfaces.

2. The method of refurbishing a turbine component as defined in claim 1, which includes the additional step of welding an elongate surface portion of the component spaced from and substantially coextensive with the trailing edge to reinforce the component prior to plasma spraying the molten metal on the component.

3. The method of refurbishing a turbine component, which includes the steps of welding cracks in the component surface, welding a metal bead on the trailing edge of the component to build up the same, welding a metal bead on an elongate eroded surface portion of the component spaced from and substantially coextensive with the trailing edge to reinforce the component, plasma spraying molten metal on said metal beads, said eroded surfaces and other eroded surfaces of the component to build up the same beyond the original surfaces, and grinding down the built-up surfaces to refinish the same to conform with the original vane surfaces.

4. The method of refurbishing a turbine component as defined in claim 3, and including a further step of welding closed any air-passages adjacent the trailing edge prior to plasma spraying the component surfaces.

5. The method of refurbishing a turbine component as defined in claim 3, wherein the step of welding said metal bead on an eroded portion of the component is carried out at locations spaced from and substantially coextensive with the trailing edge thereof along the concave airfoil face, prior to plasma spraying the component.

6. The method of refurbishing a turbine component as defined in claim 3, wherein the step of welding said metal bead on an eroded portion of the component is carried out at locations spaced from and substantially coextensive with the trailing edge thereof along the convex airfoil face, prior to plasma spraying the component.

7. The method of refurbishing an airfoil-shaped metal alloy turbine part having a composition containing substantial quantities of cobalt, with silicon present in an amount substantially of several percent, comprising the steps of mixing a preparation of an overlay metal alloy comprising substantially the same respective amount of cobalt as contained in said turbine part and with silicon present in an amount substantially of several percent, adding to said preparation an amount of silicon on the order of 10% or more of the silicon content of the preparation, converting said preparation and added silicon into a molten alloy, applying said molten alloy to the eroded surfaces of the airfoil of the part to build-up the same beyond its original surface and sintering the part in a furnace at a temperature above 2,000° F. while burning off substantially all of the added silicon contained in the molten alloy that was applied to said part such that the resultant overlay alloy has substantially the same composition as the turbine part, removing and cooling the turbine part, and grinding the overlay surface of the airfoil of the part to restore the dimensions thereof substantially to those of a new part.

* * * * *